United States Patent
Sun

(10) Patent No.: US 7,483,359 B2
(45) Date of Patent: *Jan. 27, 2009

(54) OPTICAL PICKUP HEAD AND INFORMATION RECORDING AND/OR REPRODUCING APPARATUS INCORPORATING SAME

(75) Inventor: Wen-Hsin Sun, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 725 days.

This patent is subject to a terminal disclaimer.

(21) Appl. No.: 11/077,781

(22) Filed: Mar. 11, 2005

(65) Prior Publication Data

US 2006/0077808 A1     Apr. 13, 2006

(30) Foreign Application Priority Data

Apr. 9, 2004     (TW) .............................. 93109883 A

(51) Int. Cl.
G11B 7/135     (2006.01)
(52) U.S. Cl. ............................. 369/112.28; 369/112.01; 369/44.23
(58) Field of Classification Search ............ 369/112.01, 369/112.28, 44.23; G11B 7/135, 7/00
See application file for complete search history.

(56) References Cited

U.S. PATENT DOCUMENTS

| | | | |
|---|---|---|---|
| 5,189,655 A | 2/1993 | Ogata et al. | |
| 6,324,150 B1 | 11/2001 | Ju | |
| 6,442,124 B1 | 8/2002 | Chung et al. | |
| 6,654,336 B2 | 11/2003 | Kadowaki et al. | |
| 6,747,939 B2 | 6/2004 | Saitoh et al. | |
| 7,336,587 B2 * | 2/2008 | Sun ........................ | 369/112.28 |
| 2003/0090988 A1 | 5/2003 | Sun et al. | |
| 2003/0185136 A1 | 10/2003 | Kaiho et al. | |
| 2003/0235137 A1 | 12/2003 | Nishioka et al. | |

OTHER PUBLICATIONS

Hsin-Chang Hsiung, "Optical System Design In Combo Pick-up Head", Master's Degree Thesis, Jun. 1993, pp. 52 and 57, Graduate Institute of Applied Physics, Chung Yuan Christian University, Taiwan, Republic of China.

* cited by examiner

*Primary Examiner*—Aristotelis M Psitos
(74) *Attorney, Agent, or Firm*—Morris Manning Martin LLP; Tim Tingkang Xia, Esq.

(57) ABSTRACT

An optical pickup head (100) for a high density recording and/or reproducing device compatible with first and second optical recording media. The pickup head includes a first light source (11) emitting first light beams with a first wavelength, a second light source (12) emitting second light beams with a second wavelength greater than the first wavelength, a prism unit (3), a collimating lens (4) located beside the prism unit for collimating incident first and second light beams, and an objective lens (7) for receiving the first and second light beams and transmitting the first and second laser beams to the first and second recording media respectively. The prism unit includes a first portion facing the first light source and receiving the first light beams, a second portion facing the second light source and receiving the second light beams, and an aspherical surface for the second light beams to pass therethrough.

19 Claims, 5 Drawing Sheets

OPTICAL PICKUP HEAD AND INFORMATION RECORDING AND/OR REPRODUCING APPARATUS INCORPORATING SAME

FIELD OF THE INVENTION

The present invention generally relates to an optical pickup head and an information recording and/or reproducing device using the optical pickup head, the device being able to record information on and/or reproduce recorded information from plural types of optical recording media.

PRIOR ART

Optical disks such as CDs (compact disks) and DVDs (digital versatile disks) have been used as information recording media for some time now. Recently, in order to satisfy ongoing requirements for recording and/or reproducing large quantities of information, optical disks with a memory capacity of more than 20 GB have been developed and utilized. The higher recording density of such optical disks requires that a focused spot of laser light generated by an information recording and/or reproducing device must be small and highly accurate. In general, the size of the focused spot (S) is proportional to the wavelength ($\lambda$) of the light, and inversely proportional to the numerical aperture (NA) of a lens that focuses the light, as expressed by the following formula (1):

$$S \propto \lambda/NA \quad (1)$$

Therefore, there is a need to construct an optical pickup head for an information recording and/or reproducing device which utilizes a short wavelength light such as blue light, and which provides a large NA. An industry-wide standard for a next generation of high density optical disks has been proposed. The standard specifies that an objective lens have an NA of 0.85, and that light beams with a wavelength of about 405 nm be used.

However, increasing the NA of an objective lens leads to sharp increases in coma aberration, a phenomenon which occurs when an optical disk is tilted. Coma aberration in turn leads to poor quality light convergence to the focused spot. Coma aberration caused by tilting of the optical disk is proportional to a thickness of an optical transmissive layer which is between a light entering plane and an information recording plane of the optical disk. Accordingly, increases in coma aberration caused by increasing the NA can be controlled by reducing the thickness of the optical transmissive layer. This approach forms the basis of a current proposal to reduce the thickness of the optical transmissive layer of next generation high density optical disks from 0.6 mm to 0.1 mm.

In using next generation high density optical disks, the first consideration is the compatibility of corresponding equipment with existing optical disks. Stated differently, a recording and/or reproducing device for next generation high density optical disks should also be capable of recording and/or reproducing data on DVDs which are now in widespread use. However, as indicated above, there are many differences between the two types of disks. This makes it difficult to ensure compatibility of equipment with both types of disks.

In a conventional solution to the above problem, an optical pickup head for a high density recording and/or reproducing device includes a first semiconductor laser emitting a first light beam at a short wavelength of about 405 nm, and a second semiconductor laser emitting a second light beam at a long wavelength of about 650 nm. The first and second light beams are rendered by two collimating lenses respectively. Then, a dichroic prism merges the first and second light beams and aligns the optical axes thereof. The merged light is transmitted to a common objective lens. The light then forms a small light spot on a recording plane of an optical disk.

The major drawback of the optical pickup head is that it requires a large distance between the first and second semiconductor lasers and the corresponding collimating lens. This makes the overall size of the recording and/or reproducing device unduly large. Furthermore, because there is only the single common objective lens focusing light having the two different wavelengths, the focusing of the light of one of these wavelengths is subject to chromatic aberration. Moreover, the two kinds of disks have different thicknesses, including different thicknesses of light transmission layers thereof. Therefore the focusing of the light of either or both wavelengths is subject to spherical aberration. These problems in turn lead to poor quality light convergence to the focused light spot.

SUMMARY OF THE INVENTION

Accordingly, an object of the present invention is to provide an optical pickup head for a high density recording and/or reproducing device compatible with at least two types of optical disks, in which optical aberrations are corrected and a size of the optical pickup head is reduced.

Another object of the present invention is to provide an information recording and/or reproducing device using the above described optical pickup head.

To achieve the first above object, an optical pickup head for a high density recording and/or reproducing device compatible with first and second optical recording media is provided. The optical pickup head includes a first light source emitting first light beams with a first wavelength, a second light source emitting second light beams with a second wavelength greater than the first wavelength, a prism unit, a collimating lens located beside the prism unit for collimating incident first and second light beams, and an objective lens for receiving the first and second light beams and transmitting the first and second light beams to the first and second recording media respectively. The prism unit includes a first portion facing the first light source adapted to receive the first light beams emitted by the first light source, a second portion facing the second light source adapted to receive the second light beams emitted by the second light source, and an aspherical surface for the second light beams to pass therethrough.

To achieve the second above object, an information recording and/or reproducing device includes an optical pickup head as described in the above paragraph, a drive mechanism for changing a relative position between an information storage medium and the optical pickup head, and an electrical signal processor for receiving signals output from the optical pickup head and performing calculations to obtain desired information.

Other objects, advantages and novel features of the present invention will be drawn from the following detailed description of preferred embodiments thereof with the attached drawings, in which:

DETAILED DESCRIPTION OF THE INVENTION

Figure 1:
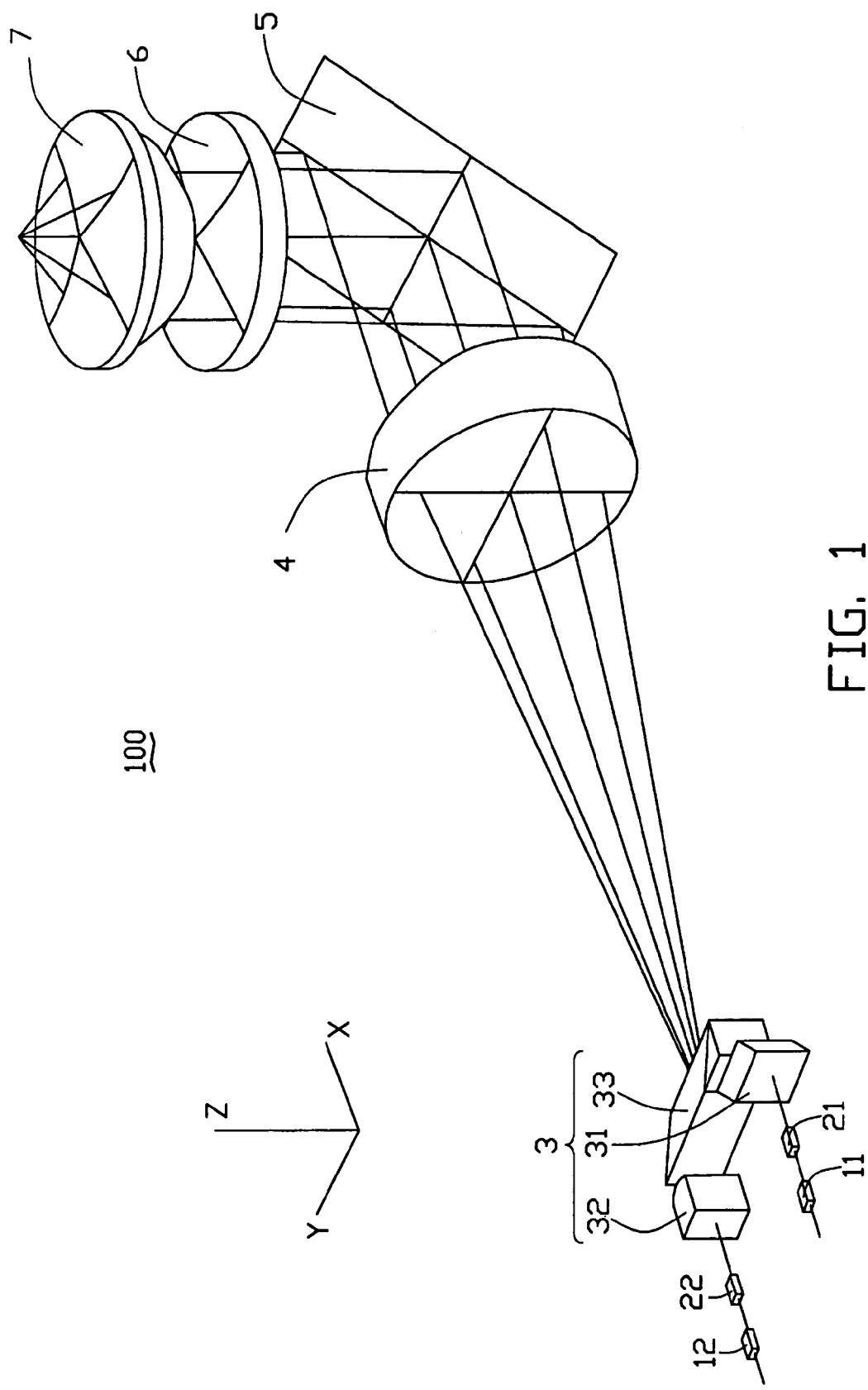
FIG. 1 is an exploded, isometric view of an arrangement of parts of an optical pickup head according to a preferred embodiment of the present invention, also showing essential optical paths thereof.
Figure 2:
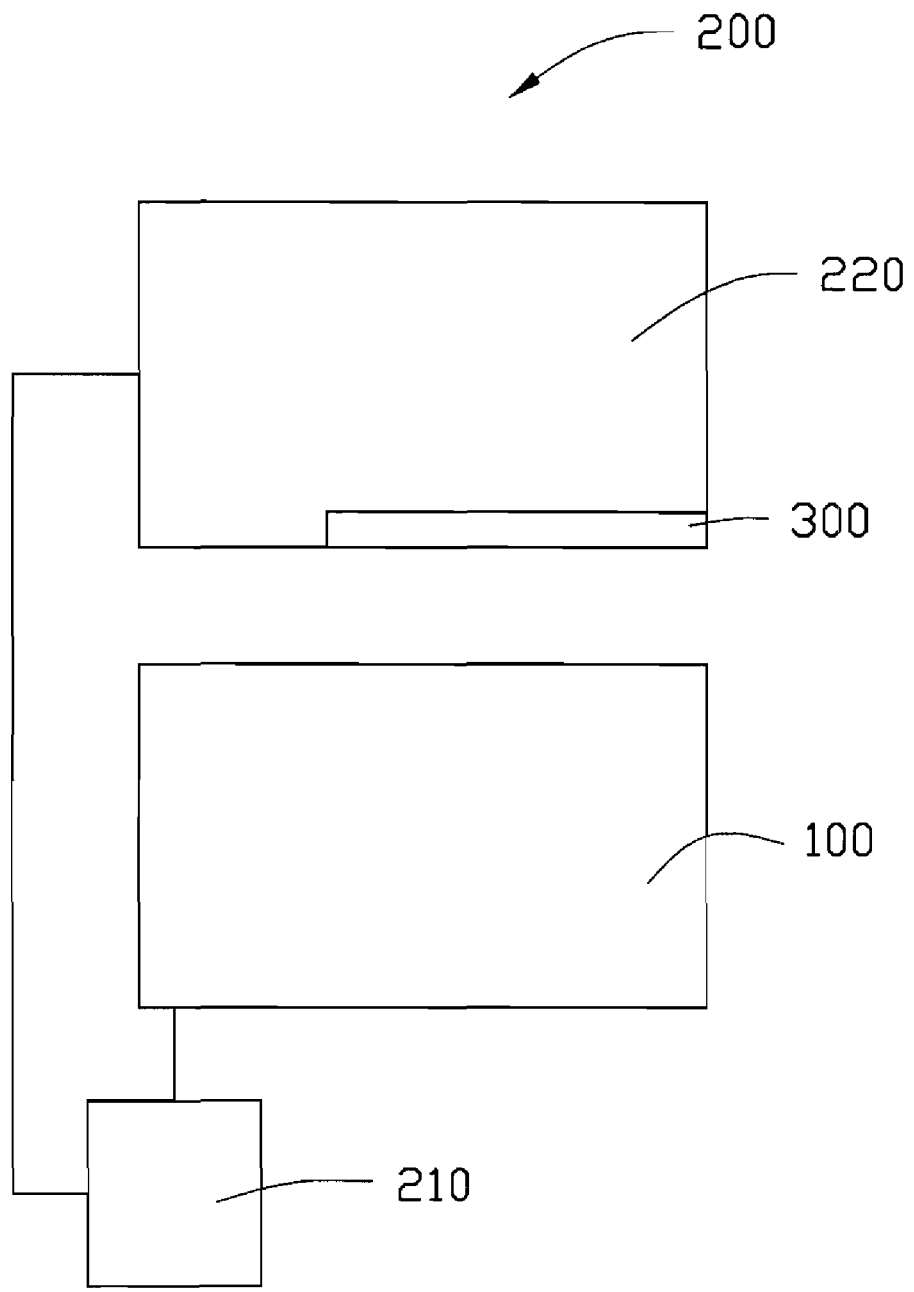
FIG. 2 is a schematic diagram of an information recording and/or reproducing apparatus including the optical pickup head of FIG. 1, together with an optical disk.

Referring to FIG. 1, an optical pickup head 100 according to the preferred embodiment of the present invention is illustrated. Referring also to FIG. 2, the optical pickup head 100 is used in an information recording and/or reproducing device 200 compatible with a first optical disk having a higher recording density and a second optical disk having a lower recording density. In FIG. 2, an exemplary optical disk 300 is shown. The optical disk 300 represents either the first optical disk or the second optical disk, as the case may be. The optical pickup head 100 includes first and second semiconductor modules 11 and 12 juxtaposed with each other. Each of the first and second semiconductor modules 11 and 12 includes a semiconductor laser (not shown), and a photo detector (not shown) formed integrally with the semiconductor laser. The two semiconductor lasers generate laser beams with different wavelengths to be employed as irradiation light beams. First light beams from the first semiconductor module 11 have a short wavelength, such as 405 nm; and second light beams from the second semiconductor module 12 have a long wavelength, such as 650 nm.

The optical pickup head 100 also includes first and second diffraction gratings 21 and 22, a prism unit 3, a collimating lens 4, a mirror 5, a wavelength selector 6, and an objective lens 7. The prism unit 3 comprises three prisms 31, 32 and 33. The first and second prisms 31 and 32 are juxtaposed at a common side of the third prism 33, and respectively face the first and second semiconductor modules 11 and 12. The first diffraction grating 21 is located in a light path between the first semiconductor module 11 and the first prism 31, and the second diffraction grating 22 is located in a light path between the second semiconductor module 12 and the second prism 32. The collimating lens 4 is positioned at an opposite side of the third prism 33, and accords with the wavelength of the first light beams so as to converge the first light beams into parallel light beams. The mirror 5 is oblique so as to reflect light beams from the collimating lens 4 to the wavelength selector 6. The objective lens 7 has a numerical aperture specified by the first optical disk, which is larger then a numerical aperture specified by the second optical disk. The wavelength selector 6 is located beside the objective lens 7, to selectively transmit light beams thereto.

Figure 3A:
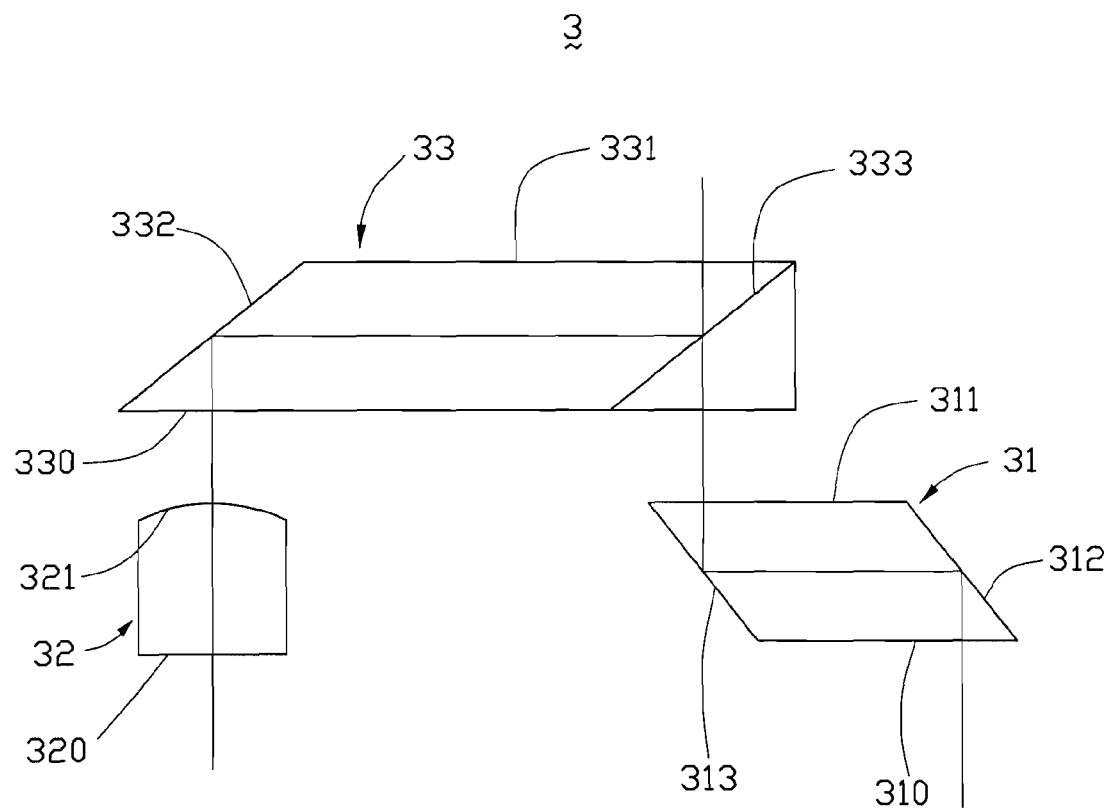
FIG. 3A is an exploded, top plan view of a prism unit of the optical pickup head of FIG. 1, also showing essential optical paths thereof.
Figure 3B:
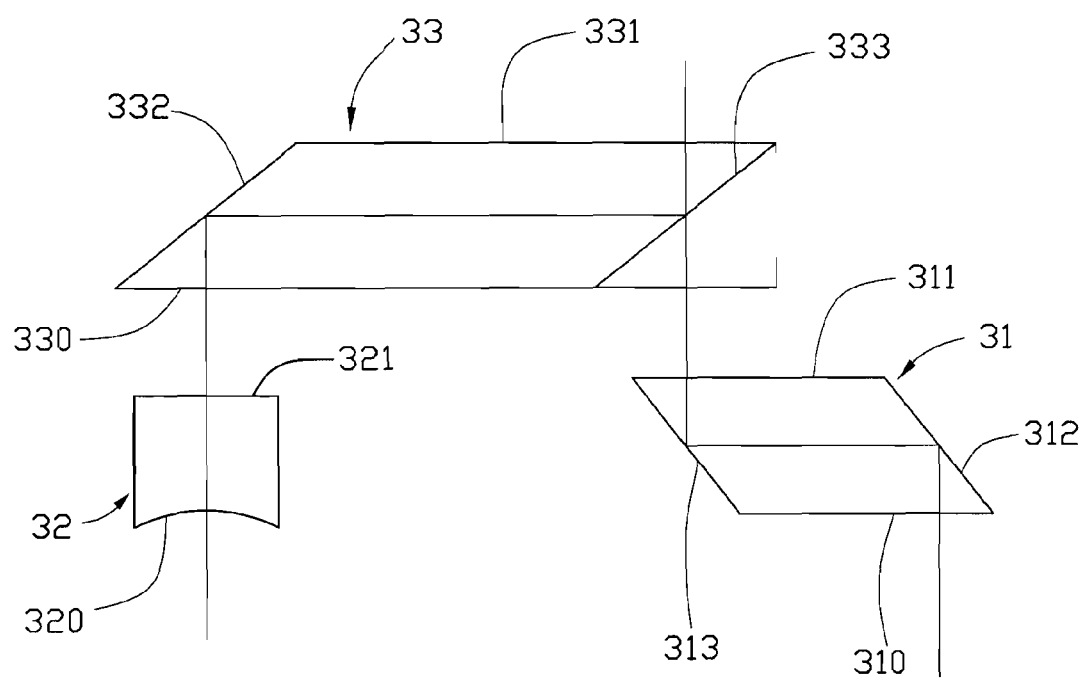
FIG. 3B is an exploded, top plan view of a prism unit of an optical pickup head in accordance with an alternative embodiment of the present invention, also showing essential optical paths thereof.
Figure 3C:
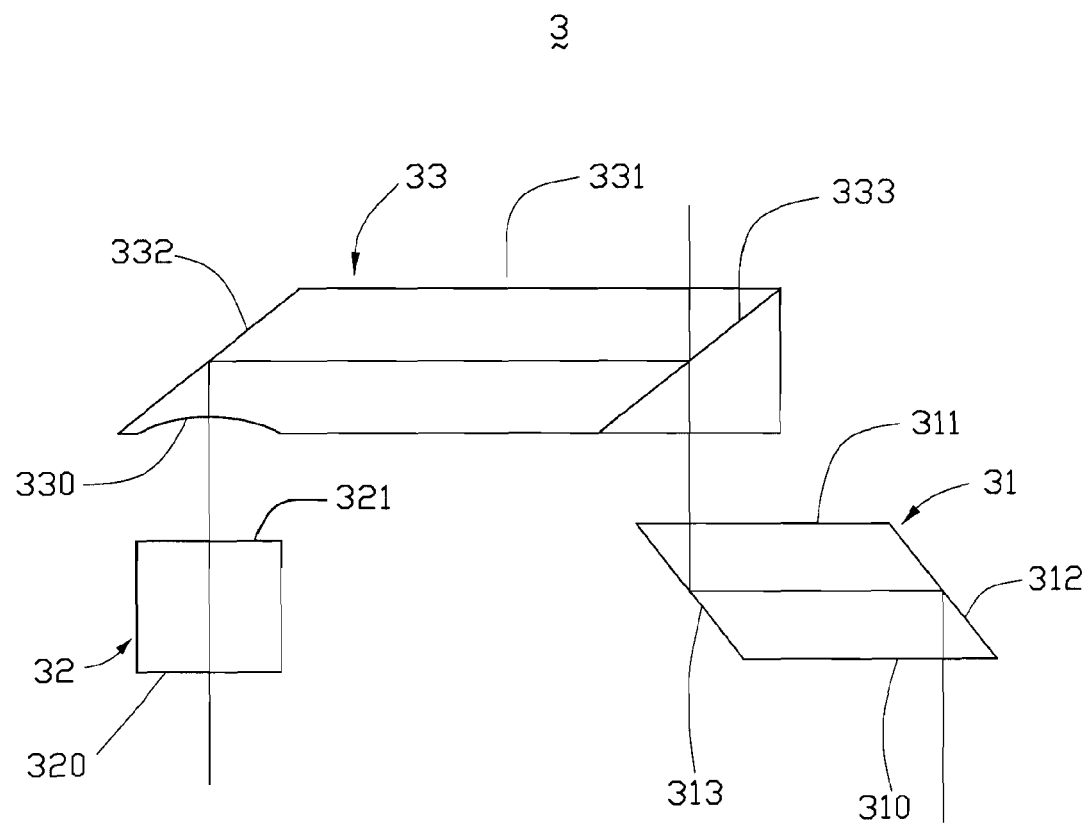
FIG. 3C is an exploded, top plan view of a prism unit of an optical pickup head in accordance with another alternative embodiment of the present invention, also showing essential optical paths thereof.

Referring to FIG. 3A, the first prism 31 is parallelepiped, and includes a first incident surface 310, a first emergent surface 311 parallel to the first incident surface 310, and two parallel reflective surfaces 312 and 313 interconnecting the first incident surface 310 and first emergent surface 311. The second prism 32 is formed with an aspherical surface, and includes a second incident surface 320 and a second emergent surface 321. In the embodiment illustrated in FIG. 3A, the aspherical surface is provided at the second emergent surface 321. In alternative embodiments, the aspherical surface can be provided at the second incident surface 320 (e.g., see FIG. 3B) or on the third prism 33 (e.g., see FIG. 3C). The third prism 33 includes a third incident surface 330. Part of the first emergent surface 311 and the second emergent surface 321 are juxtaposed beside two opposite ends of the third incident surface 330 respectively. The third prism 33 also includes a third emergent surface 331 parallel to the third incident surface 330, a third reflective surface 332 interconnecting the third incident surface 330 and the third emergent surface 331 at corresponding ends thereof, and an optical path synthesizing/separating surface 333 parallel to the third reflective surface 332 at an opposite side of the third prism 33.

When recording an information signal on and/or reproducing an information signal from the first optical disk, the semiconductor laser of the first semiconductor module 11 emits first light beams with the short wavelength 405 nm. The first light beams propagate through the diffraction grating 21 along their original direction, and enter the first prism 31 through the first incident surface 310. In the first prism 31, the first light beams are reflected by the two opposite first reflective surfaces 312 and 313, and are then output from the first emergent surface 311. The first light beams transmit into the third prism 33 through the third incident surface 330, and propagate to the optical path synthesizing/separating surface 333. The first light beams pass through the optical path synthesizing/separating surface 333 along their original direction, because of their short wavelength. Subsequently, the first light beams transmit out from the third emergent surface 331.

After exiting the prism unit 3, the first light beams are condensed by the collimating lens 4 and transformed into a first luminous flux of parallel light beams. Because the collimating lens 4 accords with the wavelength of the first light beams, it can enable beams of the first luminous flux to be fully parallel to each other. The first luminous flux transmits to the mirror 5, which changes the transmitting direction toward the first optical disk. Accordingly, the first luminous flux illuminates the wavelength selector 6. The wavelength selector 6 does not block any of the first luminous flux, so that the first luminous flux completely passes through the wavelength selector 6 and is incident on the objective lens 7. The objective lens 7 converges the first luminous flux to form a focused light spot (not shown) on the first optical disk.

After forming the light spot on the first optical disk, the first optical disk reflects the incident beams, so as to form first return beams (not labeled). The first return beams sequentially pass through/from the objective lens 7, the wavelength selector 6, the mirror 5, the collimating lens 4, and the prism unit 3, and reach the first diffraction grating 21. The first diffraction grating 21 diffracts the first return beams toward the photo detector of the first semiconductor module 11. The photo detector translates the first light beams into electrical signals. An electrical signal processor 210 of the information recording and/or reproducing device 200 receives electrical signals output from the optical pickup head 100, and performs calculations to obtain the desired information. Furthermore, a drive mechanism 220 of the information recording and/or reproducing device 200 changes a relative position between the first optical disk and the optical pickup head 100, also based on the electrical signals output from the optical pickup head 100.

When recording an information signal on and/or reproducing an information signal from the second optical disk, the semiconductor laser of the second semiconductor module 12 emits second light beams (not labeled) with the long wavelength 650 nm. The second light beams propagate through the second diffraction grating 22 along their original direction, and enter the second prism 32 through the second incident surface 320. The second light beams propagate to the second emergent surface 321 of the second prism 32, and are converged first by the aspherical surface of the second emergent surface 321. The converged second light beams transmit into the third prism 33 through the third incident surface 330, are reflected by the third reflective surface 332, and propagate to the optical path synthesizing/separating surface 333. The optical path synthesizing/separating surface 333 reflects the second light beams because of their long wavelength. Subsequently, the second light beams transmit out from the third emergent surface 331.

After exiting the prism unit 3, the second light beams are condensed by the collimating lens 4 and transformed into a second luminous flux of substantially parallel light beams. The second luminous flux transmits to the mirror 5, and is reflected by the mirror 5 toward the second optical disk. Accordingly, the second luminous flux illuminates the wavelength selector 6. The wavelength selector 6 transmits a center part of the second luminous flux, and blocks a peripheral part of the second luminous flux. Thus, only the center part of the second luminous flux can pass through the wavelength selector 6 and is incident on the objective lens 7. The objective lens 7 converges the second luminous flux to form a focused light spot (not shown) on the second optical disk.

After forming the light spot on the second optical disk, the second optical disk reflects the incident beams, so as to form second return beams (not labeled). The second return beams sequentially pass through/from the objective lens 7, the wavelength selector 6, the mirror 5, the collimating lens 4, and the prism unit 3, and reach the second diffraction grating 22. The second diffraction grating 22 diffracts the second return beams toward the photo detector of the second semiconductor module 12. The photo detector translates the second return beams into electrical signals. The electrical signal processor 210 of the information recording and/or reproducing device 200 receives electrical signals output from the optical pickup head 100, and performs calculations to obtain the desired information. Furthermore, the drive mechanism 220 of the information recording and/or reproducing device 200 changes a relative position between the second optical disk and the optical pickup head 100, also based on the electrical signals output from the optical pickup head 100.

In the above-mentioned optical pickup head 100, both (i) the working wavelength of optical elements, such as the first semiconductor module 11, the collimating lens 4 and the objective lens 7, and (ii) the numerical aperture of the objective lens 7, are directly matched with requirements of the first optical disk. Therefore, when recording an information signal on and/or reproducing an information signal from the first optical disk, the optical pickup head 100 provides high quality light convergence to the focused light spot. Further, because the aspherical surface is formed on the second prism 32, aberrations caused by non-matching between the second luminous flux and the collimating lens 4 and objective lens 7 are corrected. Moreover, the wavelength selector 6 selects a part of the light beams with long wavelength transmitting to the objective lens 7, so that only a central part of the objective lens 7 is illuminated by the second light beams. Thus the NA of the objective lens 7 is reduced when focusing the second light beams, and corresponds to the small NA required by the second optical disk. Hence, when recording an information signal on and/or reproducing an information signal from the second optical disk, the optical pickup head 100 provides high quality light convergence to the focused light spot.

Furthermore, because the first and second light beams are reflected between the surfaces of the prism unit 3, the distance between the collimating lens 4 and the first and second semiconductor modules 11 and 12 is reduced. This enables the optical pickup head 100 to be miniaturized. Moreover, the aspherical surface is directly formed on the second prism 32, so that no extra optical element need be added to the optical pickup head 100. This further facilitates miniaturization of the optical pickup head 100, and improves the efficiency of mass production.

Although the present invention has been described with reference to specific embodiments, it should be noted that these embodiments are not necessarily exclusive, and that various changes and modifications may be made to the described embodiments without departing from the scope of the invention as defined by the appended claims.

What is claimed is:

1. An optical pickup head for a high density recording and/or reproducing device compatible with at least first and second optical recording media, comprising:
    a first light source emitting first light beams with a first wavelength;
    a second light source emitting second light beams with a second wavelength greater than the first wavelength;
    a prism unit including a first prism facing the first light source adapted to receive the first light beams emitted by the first light source, a second prism facing the second light source adapted to receive the second light beams emitted by the second light source, and an aspherical surface for the second light beams to pass therethrough;
    a collimating lens located beside the prism unit for collimating incident first and second light beams; and
    an objective lens for receiving the first and second light beams and transmitting the first and second light beams to the at least first and second optical recording media respectively.

2. The optical pickup head according to claim 1, wherein the first prism is juxtaposed with the second prism.

3. The optical pickup head according to claim 2, wherein the prism unit further includes a third prism, and the first prism and the second prism are located on a same side of the third prism.

4. The optical pickup head according to claim 3, wherein the second prism comprises an emergent surface which comprises the aspherical surface.

5. The optical pickup head according to claim 3, wherein the aspherical surface is formed on the third prism.

6. The optical pickup head according to claim 3, wherein the second prism comprises an incident surface which comprises the aspherical surface.

7. The optical pickup head according to claim 1, wherein the collimating lens is disposed in a light path between the objective lens and the first and second light sources to collimate at least one of the first and second light beams into parallel light beams.

8. The optical pickup head according to claim 1, wherein the objective lens has a numerical aperture specified by one of the at least first and second optical recording media, being that which has the higher recording density.

9. The optical pickup head according to claim 1, further comprising a wavelength selector located between the collimating lens and the objective lens, for selectively passing a portion of the second light beams.

10. The optical pickup head according to claim 9, wherein the wavelength selector does not block any of the first light beams.

11. An optical pickup head for a high density recording and/or reproducing device which is compatible with at least first and second optical recording media, comprising:
    a first light source emitting first light beams with a first wavelength;

a second light source emitting second light beams with a second wavelength greater than the first wavelength;

a prism unit including a first prism facing the first light source, a second prism facing the second light source, and a third prism beside the first and second prisms;

a collimating lens for collimating incident first and second light beams;

an objective lens for receiving the first and second light beams and transmitting the first and second light beams to the at least first and second optical recording media; and a wavelength selector located between the collimating lens and the objective lens, for selectively passing a portion of the second light beams;

wherein, the prism unit further includes an aspherical surface, and only the second light beams pass through the aspherical surface.

12. The optical pickup head according to claim 11, wherein the second prism comprises an emergent surface which comprises the aspherical surface.

13. The optical pickup head according to claim 11, wherein the aspherical surface is formed at an incident surface of the third prism.

14. The optical pickup head according to claim 11, wherein the second prism comprises an incident surface which comprises the aspherical surface.

15. An information recording and reproducing apparatus compatible with a selective one of first and second optical recording media, comprising:

an optical pickup head, comprising:

a first light source emitting first light beams with a first wavelength;

a second light source emitting second light beams with a second wavelength greater than the first wavelength;

a prism unit including a first prism facing the first light source adapted to receive the first light beams emitted by the first light source, a second prism facing the second light source adapted to receive the second light beams emitted by the second light source, and an aspherical surface for the second light beams to pass therethrough; and an objective lens for receiving the first and second light beams from the prism unit and transmitting the first and second light beams to the selective one of the first and second optical recording media;

a drive mechanism for changing a relative position between any one of the at least first and second optical recording media and the optical pickup head; and an electrical signal processor for receiving signals output from the optical pickup head and performing calculations to obtain desired information.

16. The information recording and reproducing apparatus according to claim 15, wherein the first prism is juxtaposed with the second prism.

17. The information recording and reproducing apparatus according to claim 16, wherein the second prism comprises an emergent surface which comprises the aspherical surface.

18. The information recording and reproducing apparatus according to claim 16, wherein the prism unit further includes a third prism, and the aspherical surface is formed at an incident surface of the third prism.

19. The information recording and reproducing apparatus according to claim 16, wherein the second prism comprises an incident surface which comprises the aspherical surface.

* * * * *